Patented Dec. 30, 1947

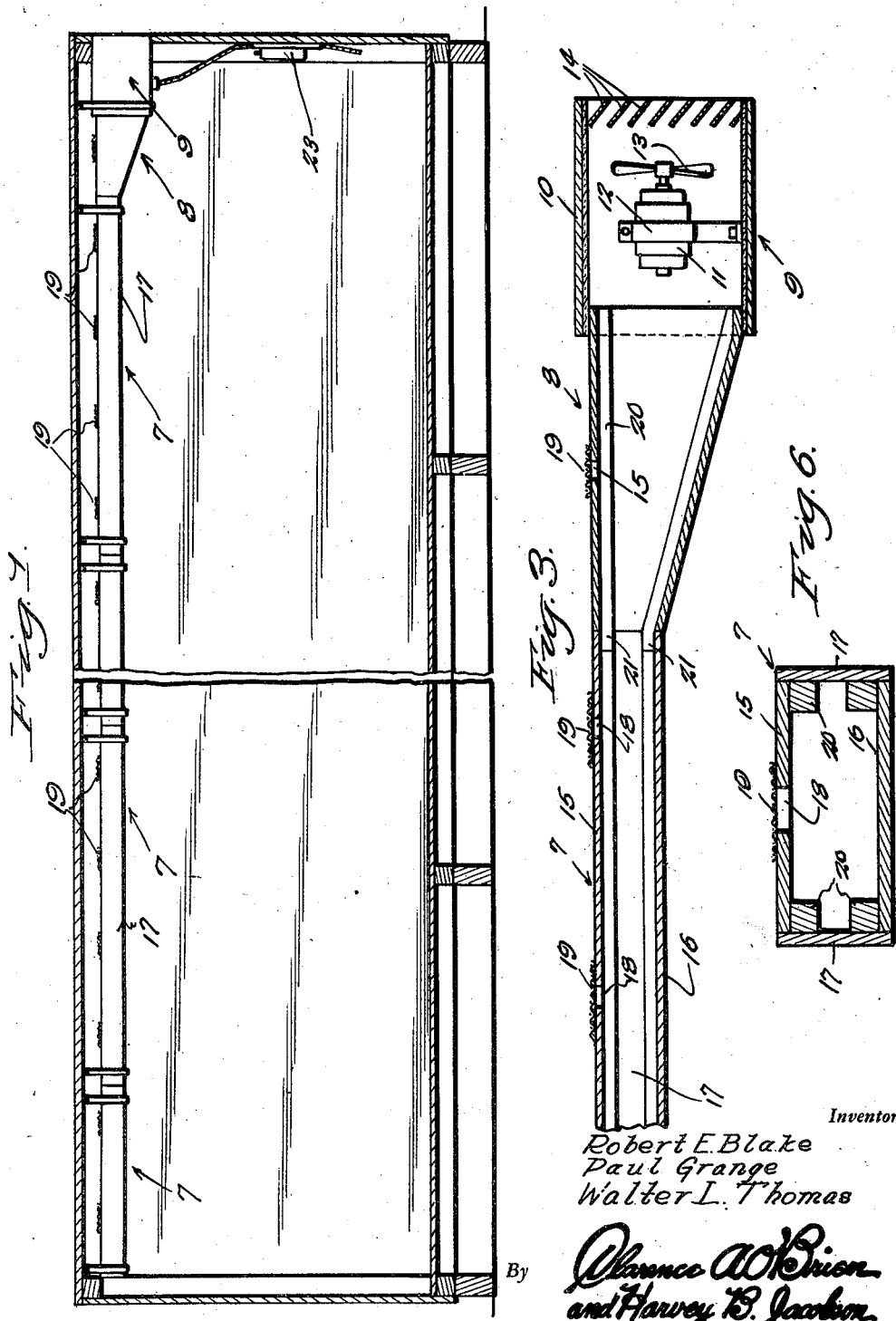

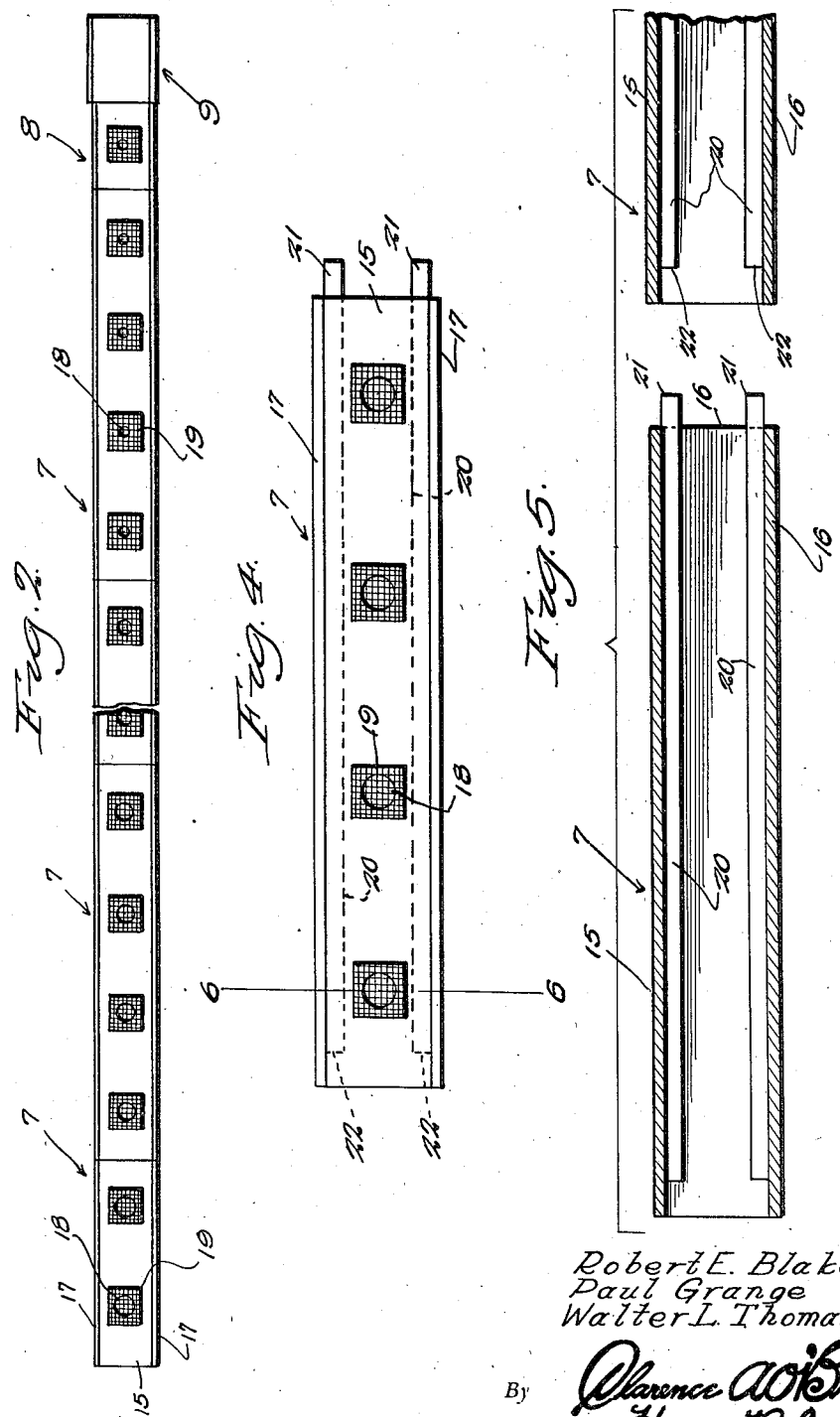

2,433,544

UNITED STATES PATENT OFFICE 2,433,544

SECTIONAL DUCT MEANS HAVING A FAN FOR REMOVING AIR FROM AN ENCLOSURE

Robert E. Blake, Paul Grange, and Walter L. Thomas, Mason City, Iowa

Application January 24, 1945, Serial No. 574,382

1 Claim. (Cl. 98—43)

This invention relates to a combination ventilator and de-humidifier, such as is applicable for use in homes, but is primarily adapted for usage in warehouses, garages, and particularly barns, chicken and hog houses.

Our primary aim is to provide a satisfactory ways and means of removing excess moisture and foul air from buildings of the aforementioned types, this by way of a sectional conduit or duct of appropriate size, the size depending on the cubic footage and moisture content of air and the conduit being placed close to the ceiling, especially in insulated buildings.

More specifically, and in carrying out the principles of the invention, the conduit is expressly made in a manner to suitably handle the moist foul air discharge, this being regulated by screened inlets in the conduit and the latter being equipped with a motor-driven fan unit of proper size to suitably handle the moist warm air content of the room in which the conduit is located.

In keeping with the specific principles of the invention, the conduit is made up of companion sections more or less of duplicate standardized forms, these being separably connected in end-to-end relation and having graduated intake holes properly screened, the holes being larger at the end remote from the fan and decreasing in diameter toward the fan in order to equalize the overall intake and to minimize the formation of objectionable drafts.

Other features and advantages will become more readily apparent from the following description and the accompanying illustrative drawings.

In the drawings, wherein like numerals are employed to designate like parts throughout the several views:

Figure 1 is a longitudinal sectional view through a room, enclosure or other structure representing a building, this showing, in elevation, the improved de-humidifier and ventilator duct properly mounted and constructed in accordance with the present invention.

Figure 2 is a top plan view of said duct.

Figure 3 is a fragmentary view partly in section and partly in elevation.

Figure 4 is a top plan view of one of the duct or conduit sections.

Figure 5 is a longitudinal sectional view through the section seen in Figure 4, a fragmentary portion of the next adacent section being shown to bring out the mode of connecting said sections with each other.

Figure 6 is a cross-section on the line 6—6 of Figure 4.

Referring now to the drawings and to Figure 1, it will be seen that the duct or conduit is of appropriate length and dimensions and is made up of a plurality of substantially duplicate complemental sections 7, these being connected at the right to an adapter section 8 which is in turn connected with the fan-equipped unit 9.

Referring now to Figure 3, it will be seen that the unit 9 comprises a suitable box-like enclosure or housing 10 provided with an appropriate electric motor 11 strapped in place as at 12, and provided with a fan 13 for circulating the air and creating the desired suction. The open discharge end of the housing is provided with appropriately arranged louvers 14. These are arranged to prevent the undesirable intake of snow and the elements. Telescopically connected to this is the aforementioned adapter section 8. Except for being tapered, it is the same in construction as the other sections 7, and therefore a description of the latter will serve for all sections.

In practice, each section 7 (see Fig. 6) is in the form of a tubular duct embodying a top 15, a bottom 16 and longitudinal side walls 17. The top is provided with longitudinally spaced intake holes 18, these covered by appropriately fastened covering screens 19. Corner strips 20 are provided on the interior, these being arranged in the four corners as shown. These strips project at one end, as indicated at 21, and the opposite ends terminate in spaced relation, as at 22, inwardly of the adacent end portion of the section. Consequently, these strips serve as reinforcing elements and also as simple ways and means of separably connecting the respective sections together in end-to-end relationship. In Figure 1, the numeral 23 designates an automatic Aratherm.

The respective sections are preferably made of asphalt-sealed boards, and although other material may be employed, these types of boards are more desirable in handling warm, moist air. If the structure is installed in cities and stores and other buildings where fire restrictions are strict, they may be then made up of fireproof metal.

The screens over the inlet holes serve to keep out birds, mice and other pests that might otherwise lodge in the passage of the duct.

The motor unit is regulated by an Aratherm (dehumidifying thermostat or a cooling thermostat such as is made by Minneapolis-Honeywell Manufacturing Co.). It is understood, however, that this is merely an accessory to the invention, and that any automatic control means can be employed.

By using a humidiguide and a temperature gauge and an annomometer, we can arrive at the correct sizes of the intake openings. The annomometer is an instrument which measures air flow which we use for determining, as stated, the size of the inlets. It has no bearing on the invention, but it is important that the correct sizes of openings be employed. The amount of air to be removed will determine the size of the inlets. The cubic footage of the building to be de-humidified enters into each individual installation. And, as before stated, the openings are large at the left and gradually decrease in diameter toward the right, that is, as they approach the fan unit 9.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

We claim:

In a structural assembly of the class described, in combination, an enclosing room adapted to be ventilated and de-humidified, and a ventilating and de-humidifying conduit mounted therein at a point close to the ceiling, said conduit being provided at the discharge end with a fan housing provided in turn with a louver-equipped opening communicating with the exterior and atmosphere, said conduit being provided in its top just below the ceiling with a plurality of longitudinally spaced intake holes covered by screens, said holes being of different diameters, the larger diameters being at the inner end remote from the fan and the smaller openings being located within the vicinity of the fan, said conduit being made up of a plurality of separable complemental sections and each section being an open ended tubular body provided in its top with air inlet holes and screens partially covering said holes, and a plurality of longitudinal strips fastened on interior of the section and located in respective corners thereof, the strips extending at corresponding ends beyond the adjacent end of the section, the opposite ends of said strips being spaced inwardly from the corresponding adjacent end of the same section.

ROBERT E. BLAKE.
PAUL GRANGE.
WALTER L. THOMAS.

REFERENCES CITED

The following references are of record in the file of this patent:

UNITED STATES PATENTS

| Number | Name | Date |
| --- | --- | --- |
| 1,138,470 | Hackney | May 4, 1915 |
| 1,416,381 | Reed | May 16, 1922 |
| 1,230,282 | Currier | June 19, 1917 |
| 968,854 | Jones | Aug. 30, 1910 |
| 780,247 | Wilcox | Jan. 17, 1905 |
| 832,247 | Edwards | Oct. 2, 1906 |
| 2,034,995 | Sibley | Mar. 24, 1936 |
| 2,311,948 | Lagodzinski | Feb. 23, 1943 |
| 2,350,735 | Egge | June 6, 1944 |
| 2,053,336 | Jacobson | Sept. 8, 1936 |
| 2,216,046 | Peck | Sept. 24, 1940 |
| 932,761 | Cooke | Aug. 31, 1909 |
| 1,027,740 | Leeming | May 28, 1912 |
| 735,823 | Roake | Aug. 11, 1903 |
| 1,518,162 | Parkinson | Dec. 9, 1924 |
| 2,087,637 | Burt | July 20, 1937 |

FOREIGN PATENTS

| Number | Country | Date |
| --- | --- | --- |
| 8,621 | Great Britain | 1913 |
| 78,506 | Switzerland | Aug. 16, 1918 |
| 711,606 | France | June 30, 1931 |